April 27, 1971   M. A. DA ROOGE ET AL   3,576,787
METHOD OF CROSSLINKING POLYMERS
Filed Feb. 25, 1969   2 Sheets-Sheet 1
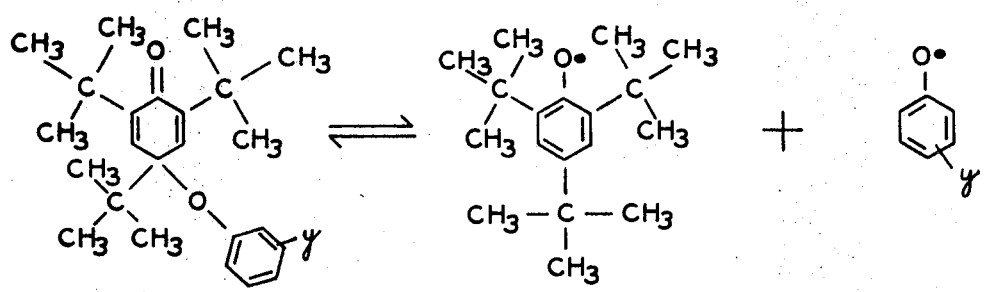
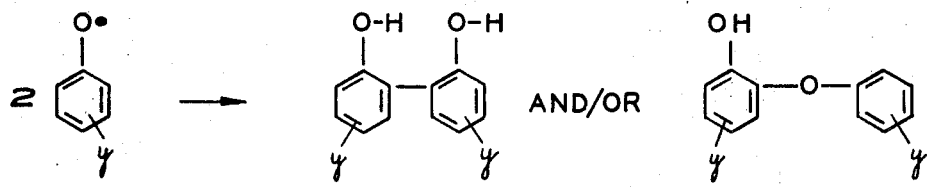
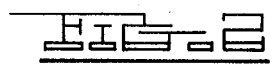
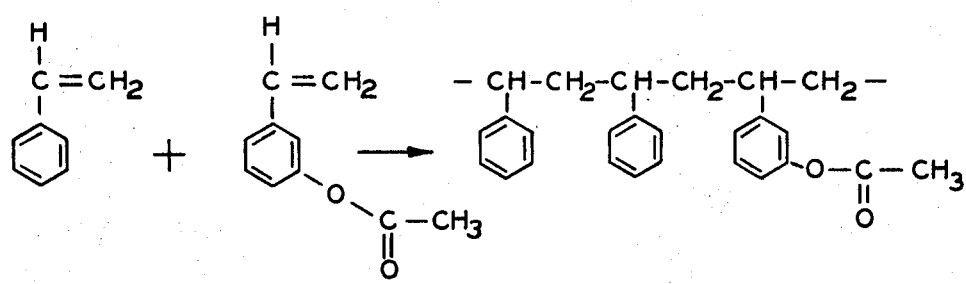
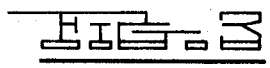
INVENTORS
LEE R. MAHONEY
MARGARET Da ROOGE
BY
John R. Faulkner
Thomas H. Oster
ATTORNEYS April 27, 1971    M. A. DA ROOGE ET AL    3,576,787
METHOD OF CROSSLINKING POLYMERS
Filed Feb. 25, 1969    2 Sheets-Sheet 2
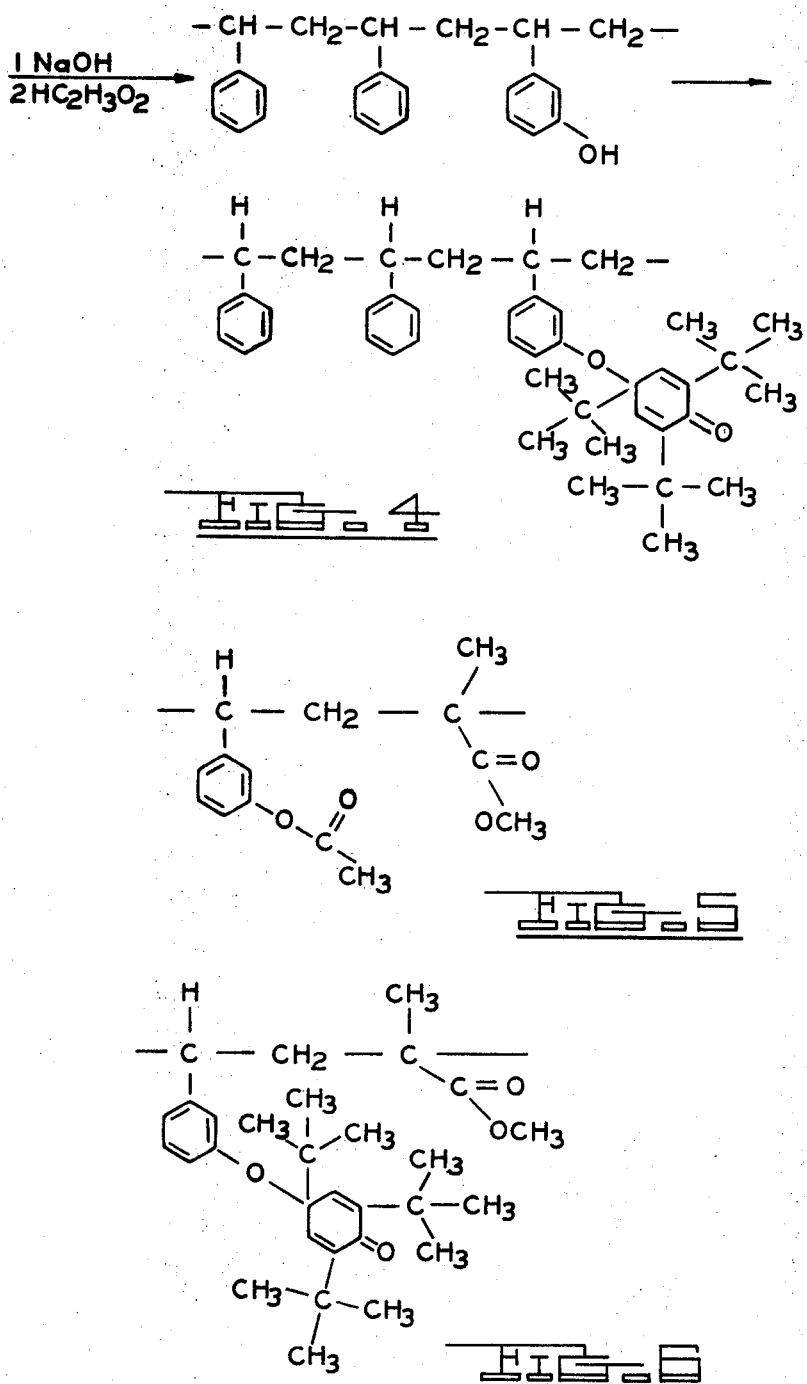
INVENTORS
LEE R. MAHONEY
MARGARET Da ROOGE
BY
John R. Faulkner
Thomas H. Oster
ATTORNEYS

United States Patent Office 3,576,787
Patented Apr. 27, 1971

3,576,787
METHOD OF CROSSLINKING POLYMERS
Margaret A. Da Rooge, Dearborn Heights, and Lee R. Mahoney, Livonia, Mich., assignors to Ford Motor Company, Dearborn, Mich.
Filed Feb. 25, 1969, Ser. No. 802,082
Int. Cl. C08f 7/02, 27/00; C08g 17/00
U.S. Cl. 260—47                                    4 Claims

ABSTRACT OF THE DISCLOSURE

This invention relates to a method of controllably crosslinking essentially linear polymers to obtain desired physical and chemical properties in the finished product. This invention requires the introduction into a molecule of a prepolymer a limited number of crosslinking quinol ether molecules which upon molding thermally decompose and simultaneously crosslink to a desired extent the linear portions of the polymer.

THE INVENTION

This invention is predicated upon the fact that quinol ethers are readily thermally decomposed to yield phenoxy radicals which are readily reactive and may be employed by proper techniques to cause the desired degree and nature of crosslinking of linear prepolymers to occur. In the interest of clarity, a reaction involving a thermal disassociate of a typical quinol ether is illustrated graphically in FIG. 1. In this drawing attention is invited to the fact that very reactive phenoxy groups have been produced. The functional group labeled Y may assume a variety of forms and is an important tool in controlling the reactions involved. To name only a few of the almost infinite number of forms Y may take it has been prepared as t-butyl, methoxy, halogen, 4-methoxy and 3-carboethoxy. The facility with which the quinol ethers thermally disassociate depends strongly upon the functional group Y. For example, the quinol ether in which the functional group Y is a 4-methoxy group thermally disassociates ten thousand times as fast as a corresponding quinol ether in which the functional group Y is a 3-carboethoxy group.

Phenoxy radicals, as illustrated in the right of FIG. 1, very readily dimerize with the formation of a new chemical bond. This dimerization reaction is depicted in FIG. 2 and can result in at least two different dimers one of which has been labeled A and one of which has been labeled B according to the conditions of the reaction. The formation of this new chemical bond is susceptible of utilization in the crosslinking of linear polymers. This crosslinking is accomplished by the dimerization reaction shown in FIG. 2 when a quinol ether is provided on the backbone of a linear polymer, typically a vinyl polymer, and the quinol ether then thermally disassociated as by the molding step.

This process has been illustrated by the preparation of copolymers as illustrated in FIG. 3. Here, styrene and 3-acetoxy styrene are copolymerized to form a linear polymer. The molal ratio of styrene to 3-acetoxy styrene employed was between 40 to 1 and 3 to 1. However, these values are not limiting and a very much higher ratio can be employed.

The polymer depicted to the right of FIG. 3 is now reacted with an agent such as sodium hydroxide or acetic acid to produce the polymer shown in the upper right portion of FIG. 4. This hydrolysis product is now reacted with the tributylated phenoxy compound shown in FIG. 1 to yield the reactive polymer shown in the lower portion of FIG. 4. This reactive copolymer manifests the same solubility properties as its hydrolyzed precursor and as ordinary polystyrene. However, upon molding at 150° C. to 175° C. for thirty minutes this reactive polymer is converted to a dense, completely insoluble material which exhibits the same mechanical properties such as stress-train behavior as crosslinked polystyrene.

As a further specific example of this invention, a copolymer of 3-acetoxy styrene and methyl methacrylate has been prepared as shown in FIG. 5. This copolymer has been converted to the corresponding quinol ether as shown in FIG. 6. This material upon molding also crosslinks in a manner entirely analogous to a polystyrene copolymer. This is a general type of reaction and can readily be applied, as for example, to vinyl polymers, phenoxide polymers, phenol-formaldehyde polymers, polyesters and many other polymer systems which will immediately occur to a skilled polymer chemist. The degree of crosslinking can be controlled by the number of quinol ether units per chain. The temperature at which crosslinking occurs can be controlled by the substitution in the cyclohexadiene—one ring of the quinol ether or by the substitution of the phenoxide portion of the quinol ether.

Preparation of 3-acetoxystyrene-styrene copolymers

The styrene was a commercial grade and distilled from copper powder immediately prior to use. The 3-acetoxystyrene was prepared from the dehydrogenation of 3-acetoxymethylbenzyl alcohol using $KHSO_4$ as the dehydrating agent as previously described.

The desired amounts of styrene, 3-acetoxystyrene and 2,2'-azobisiso-butyronitrile (AIBN) were placed in tubes, degassed and sealed. The polymerizations were carried out at 60° C. for 3–7 days. The polymer was isolated by precipitation from methanol. For example, 75 ml. styrene, 6 ml. 3-acetoxystyrene and 50 mg. AIBN afforded material having an intrinsic viscosity at infinite dilution in benzene at 30° C. equal to 2.49. This corresponds to a molecular weight of 900,000.

Preparation of 3-hydroxystyrene-styrene copolymers

Samples of the 3-acetoxystyrene-styrene copolymers were dissolved in dioxane under $N_2$. A solution containing a two-fold excess of sodium hydroxide in 95% dioxane-water was added and the mixture stirred for two hours. The polymer was precipitated from methanol. Infra-red analysis showed the absence of acetate bonds.

Preparation of quinol ether of 3-hydroxystyrene-styrene copolymer

Samples of the 3-hydroxystyrene-styrene copolymer were dissolved in benzene under $N_2$ and treated with a two-fold excess of the 2,4,6 tri-t-butylphenoxy radical in benzene. A convenient preparation of this radical has been described. The polymer was precipitated from methanol. Infra-red analysis shows typical quinol ether bands at 6.0 and 6.1 m$\mu$. When the molal ratio of styrene to 3-acetoxystyrene is 3 to 1, the polymer has a pale yellow color.

Crosslinking experiments

The quinol ethers were molded at 30,000 p.s.i. at 150° C. for 20 minutes using a conventional molding press. The molded material was insoluble in organic solvents. For example, a sample weighing .2583 g. of the polymer obtained in the preparation of 3-acetoxystyrene-styrene copolymers absorbed 2.97 g. $CCl_4$ after crosslinking.

BIBLIOGRAPHY

M. A. DaRooge and L. R. Mahoney: J. Org. Chem., 31, 1. (1967).

W. J. Emerson, J. W. Heyd, V. E. Lucas, W. B. Cook, G. R. Owens and R. W. Shortridge: J. Am. Chem. Soc., 68, 1665 (1946).

We claim as our invention:

1. The process of preparing a crosslinked polymer comprising preparing a prepolymer having a plurality of linear polymer chains, said polymer chain having a plurality of aryl groups attached thereto, converting some of the aryl groups to thermally labile quinol ethers attached to the polymer chains and heating such prepolymer with its attached quinol ethers to disassociate the attached quinol ethers into two reactive phenoxy groups which reactive groups recombine to crosslink the polymer chains of said prepolymer.

2. The process of claim 1 in which a hydroxyl group is first attached to the prepolymer chain and the hydroxyl is reacted with a phenoxy compound to establish a quinol ether attached to the prepolymer chains.

3. The process of claim 2 in which the hydroxyl group is obtained by incorporating into the prepolymer 3-acetoxystyrene and then hydrolyzing away the acetic radical.

4. The process of claim 1 in which the prepolymer is a styrene polymer, or a vinyl polymer, or a phenoxide polymer, or a phenol-formaldehyde polymer or a polyester polymer.

References Cited

UNITED STATES PATENTS 2,735,837    2/1956    Minsk _____ 260—47

JOSEPH L. SCHOFER, Primary Examiner

C. A. HENDERSON, Jr., Assistant Examiner

U.S. Cl. X.R.

260—59, 75, 80, 88.1, 93.5